April 30, 1963 C. A. KINGSFORD-SMITH 3,088,106
RESPONDER DEVICE
Filed April 4, 1960

INVENTOR.
CHARLES A. KINGSFORD-SMITH
BY Edward A. Robinson
ATTORNEY 3,088,106
RESPONDER DEVICE
Charles A. Kingsford-Smith, Menlo Park, Calif., assignor to General Precision, Inc., Binghamton, N.Y., a corporation of Delaware
Filed Apr. 4, 1960, Ser. No. 19,860
6 Claims. (Cl. 343—6.8)

This invention relates to interrogator-responder signalling systems, and more particularly, to an improved responder device for use in such a system.

Application Serial No. 739,909, filed June 4, 1958, by Clarence S. Jones for "Signalling System," now U.S. Patent No. 3,054,100 and assigned to the same assignee as the instant invention, discloses an improved interrogator-responder system capable of electronically transmitting data between an interrogator device and one or more passive responder devices, where relative motion may occur between the interrogator device and each responder, so that signals may be provided from each responder which uniquely identify the responder, and, or instead, indicate one or more conditions associated with the responder. The exemplary disclosed application of the prior invention is the use of passive responder devices on vehicles, such as railroad boxcars, for the purpose of identifying each car as it passes along a track adjacent to which an interrogator unit is located. The interrogator unit is essentially a transmitter-modulator connected to supply a strong interrogator signal on an interrogator frequency to an interrogator output conductor or coil located near or under the railroad tracks. When a boxcar carrying a responder approaches along the tracks, nearing the interrogator coil, operating voltage of sufficient magnitude is induced in the responder to cause emission by the responder of a coded response signal at a response frequency differing in frequency from the interrogator frequency. A response pick-up coil located near the interrogator coil and tuned to the response frequency picks up the response signal, which consists of a radio frequency carrier having a plurality of audio sidebands. Each individual responder is coded to use a unique and different set of audio frequencies in modulating its response carrier, so that detecting and decoding a response signal enables one to identify a responder. Apparatus of the abovedescribed type is marketed under the trademark "Tracer" by the assignee of this application.

In constructing signalling systems of the abovementioned type, it is usually desirable to use fairly low radio frequencies as the interrogator and response carriers, since lower frequency signals are less directional, thereby obviating physical alignment problems which arise with high frequency equipment, and also because lower frequency signals are less severely attenuated by ice, water and conductive wastes frequently encountered. Typical interrogator and response frequencies lie in the 75–400 kilocycle per second band.

An arrangement for generating and transmitting a carrier signal together with a plurality of sideband signals is shown in a patent application of Robert A. Kleist, Serial No. 15,597, entitled "Signalling System," filed on an even date herewith, now U.S. Patent No. 3,036,295. In this Kleist apparatus, the R.F. carrier signal and each of the R.F. sideband frequencies are generated separately by crystal controlled oscillators and are combined by a summing amplifier rather than by a conventional modulator circuit. This arrangement may provide a carrier wave with any desired number of discrete sidebands suitable for transmission of data.

In order to establish large system coding capacity (i.e. the ability to distinguish between a large number of responders) without detracting from speed of response of the system, it is necessary to provide a large number of subcarriers, or audio tones, each additional subcarrier effecting a doubling in system coding capacity if pure binary digital coding is used. The subcarriers must be spaced at given separate frequency intervals in order to allow decoding, and hence much sideband width is sometimes needed to provide a sufficient number of subcarrier channels and system coding digits. The requirements of low carrier frequencies and wide sideband width to accommodate numerous subcarriers are mutually inconsistent. In most communications systems carrier frequencies are many times higher than modulating frequencies, which greatly simplifies many system design and performance considerations, since circuit elements may be selected so as to operate on the carrier without appreciably affecting subcarriers, or vice versa. For example, in a typical broadcast station of 1000 kc., the very highest audio modulation is 5 kc., or at a ratio of 200 to 1. Circuit elements may be designated as either RF or audio. Conversely, in a typical "Tracer" interrogator-responder signalling system, a plurality of discrete audio tones spread over a 5 kc. band may be modulated on a 100 kc. carrier, at a carrier-subcarrier frequency ratio of merely 20 to 1. Using such a relatively low ratio, certain circuit elements may no longer be treated as "carrier" elements as opposed to "subcarrier" or "audio" elements, as the given element may affect both frequencies materially. Using conventional techniques, a low carrier-subcarrier frequency ratio will lead to undesirable bandwidth limiting of modulated responder signals in apparatus constructed in accordance with the applications of Clarence S. Jones and Robert A. Kleist, supra. The instant invention, therefore, is an improvement over the prior responders used in such systems, as it overcomes undesirable bandwidth limiting caused by the low carrier-subcarrier frequency ratio otherwise desirable and necessary in many interrogator-responder signalling systems.

In the interrogator responder systems, the responder unit carried by the box car, bus or other vehicle is a comparatively small light weight unit and is passive in a sense that it contains no batteries or is coupled to no source of electrical power. The responder unit must receive sufficient energy from the carrier wave of the interrogator signal to excite its oscillator circuit and to develop and transmit a coded response signal. Therefore, the term passive unit or passive response circuit as used in this specification will refer to such circuits capable of operation without any source of energy other than the energy supplied by the interrogator signal.

It is an object of this invention to provide an improved passive response circuit, and more specifically it is an object to provide such a circuit capable of receiving a signal having a broad band of frequencies and of re-transmitting selected ones of the frequencies in accordance with an identification code.

It is a further object of this invention to provide an improved oscillator and modulation circuit for a passive response device, and more specifically it is an object to provide such a circuit with separate paths for passing radio frequencies and audio frequencies such that the high capacitive "Miller" effect will not unduly load this response circuit which depends upon the received interrogator signal for its operating power.

Numerous other objects and advantages will be apparent throughout the progress of the specification which follows. The accompanying drawings illustrate a certain selected embodiment of the invention and the views therein are as follows:

FIG. 1b is an equivalent circuit diagram useful in understanding operation of the circuit of FIG. 1a;

FIG. 2b is an equivalent circuit diagram useful in understanding operation of the improved device of FIG. 2a.

Briefly stated, according to a preferred embodiment, the passive response circuit of this invention includes a transistor oscillator with a two winding radio frequency transformer coupled thereto. The transformer provides the R.F. feedback for sustaining oscillation in the transistor at the response frequency, but the various audio frequencies cannot pass through the transformer and the Miller amplification effect of the audio frequencies is eliminated.

Figure 1B:
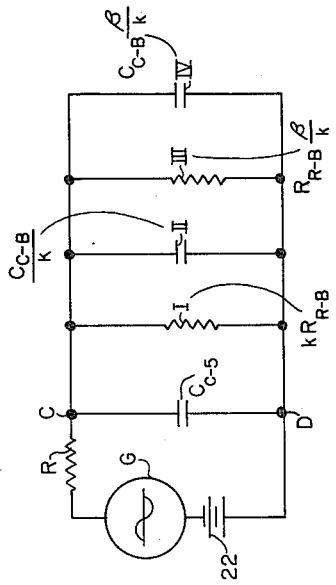
Figure 1A:
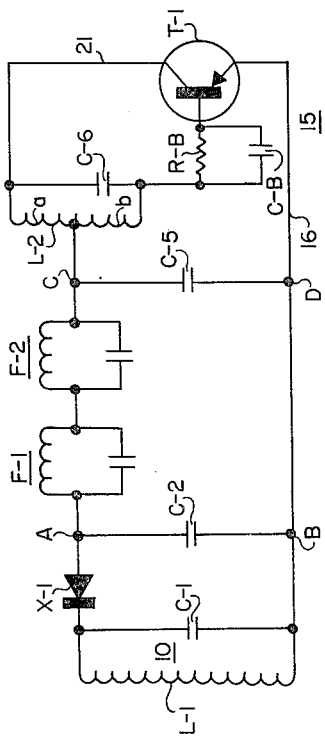
FIG. 1a is an electrical schematic diagram showing a typical responder circuit of the prior art.

Referring to FIG. 1a, the input circuit of the prior art responder is shown as comprising a tuned circuit 10 comprising an inductance L-1 and a capacitance C-1. The parallel resonant circuit 10 is tuned, for example, to be centered on an interrogator carrier frequency of perhaps 100 kc., and provided with a bandwidth of 10 kc. to receive a plurality of audio tones in a 5 kc. band which are double sideband amplitude modulated on the 100 kc. carrier. The signal across the tuned circuit 10 is demodulated by a means shown as comprising a diode rectifier X-1 and a carrier filter capacitor C-2. Demodulation of the interrogator signal provides a first composite signal between points A and B having a direct voltage component resulting from demodulation of the carrier and a plurality of audio components, one for each system coding digit, and sometimes additional audio components for automatic gain control, phase control and other purposes which need not be described in detail herein.

The first composite voltage is applied to a coding network shown as comprising filters F-1 and F-2, which in the device described are tuned to two different audio frequencies and constitute a frequency selective means. These filters F-1 and F-2 remove such frequencies from the complex voltage coded composite signal appearing between points C and D, across a capacitor C-5. Thus, the coded composite signal will comprise a direct component together with all the audio components of the original signal which were not trapped out by the coding filters F-1 and F-2. As indicated, the coded composite voltage is applied to operate a response signal generating means shown as comprising a transistorized Hartley-type oscillator shown at 15.

Application of the coded composite voltage between the points C and D (from point C through section a of inductance L-2, a conductor 21, the transistor T-1 collector-emitter circuit and a conductor 16 to point D) causes current flow in the transistor collector circuit, including the response oscillator resonant tank comprised of a transformer inductance L-2 and a capacitance C-6. Being superimposed on the D.C. supply to the oscillator 15, it will be understood that all the audio frequencies of the coded composite signal will be modulated on the response carrier, the frequency of which depends upon L-2 and C-6. Section b of inductance L-2 acts as a tickler section, applying a positive feedback or regenerative response carrier signal to the base of transistor T-1 to sustain oscillation. Resistor R-B provides base bias voltage, and capacitor C-B serves as an RF, or carrier frequency by-pass around base resistor R-B. The impedance of the inductance or transformer L-2 may be considered to be negligible at audio frequencies. The purpose of the RF by-pass capacitor C-5 is to provide a high frequency return for the response carrier signal which by-passes the responder coding network and demodulator. If provided with enough capacity to adequately decrease the return path impedance, capacitance C-5 may undesirably attenuate some of the higher subcarrier frequencies.

FIG. 1b shows the equivalent circuit for FIG. 1a at D.C. and low audio frequencies. The first composite voltage output of the diode is represented by a battery 22 connected in series with an audio generator, with a generator impedance R in series therewith. It will be understood that symbolic generator G provides a plurality of audio frequencies. The radio frequency by-pass capacitor C-5 has high impedance at low frequencies. The symbolic generator G drives the equivalent impedance of the oscillator 15, which is shown in FIG. 1b as comprising four parallel branches at low frequencies. An element I of FIG. 1b represents the impedance of the path including the base resistance R-B and the transistor base-emitter circuit, while element II represents the impedance of the path including the capacitor C-B and the transistor base-emitter circuit. In the equivalent circuit the impedances of elements I and II have been increased by multiplication by a conversion gain factor $k$, which represents the reduction in gain to a limitation in conduction angle during class C operation. In a typical embodiment, $k$ might equal $\pi$. Elements III and IV of FIG. 1b represents the impedance effectively reflected into the transistor collector-emitter circuit by the Miller amplification effect. It will be recognized that current flowing in the collector-emitter path is controlled, in accordance with the factor of current gain $\beta$, by transistor base current, which in turn is controlled by R-B and C-B, so that the resultant impedance seen by the generator is the same as if a larger capacitance and a smaller resistance were present across the generator terminals.

The large effective capacitance represented by $$C_{\text{C-B}}\frac{\beta}{k}$$

of element IV is principally responsible for restricting the modulation range, as it causes a roll-off or attenuation of the higher audio subcarriers present in the coded composite signal. It will be seen that the higher the frequency of a given audio subcarrier, the more it will be attenuated by element IV.

The problem involved was complicated by the fact that in a passive responder of the type described, response oscillator operating power or B+ power is available presuperimposed on audio frequencies, and while such superimposition facilitates modulation of the response carrier, it does not readily lend itself to the provision of a base bias supply which is electrically separated from the response carrier signal. In accordance with the invention, however, the response carrier feedback signal path and the base bias current path have been made separate, by providing a tickler coil L-4 which is electrically separate in a D.C. sense from the oscillator tank coil L-3, in the manner shown in FIG. 2a. The response oscillator anti-resonant tank is still in series with the transistor collector, but a separate transformer secondary winding L-4 is utilized in lieu of the autotransformer or Hartley-type arrangement of FIG. 1.

Figure 2B:
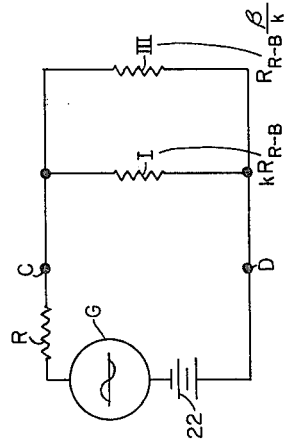
Figure 2A:
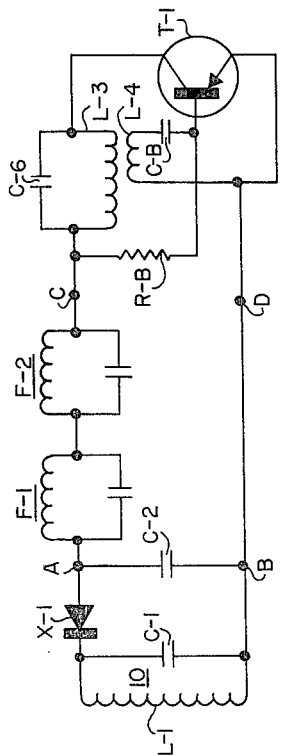
FIG. 2a is an electrical schematic diagram showing an exemplary responder constructed in accordance with the present invention.

Although capacitance C-B now is at ground potential for the D.C. and low frequency audio components, it still serves to couple the regenerative or feedback carrier signal to the transistor base to sustain oscillation. It will be noted that no carrier frequency by-pass capacitor need be provided in FIG. 2 as a counterpart for capacitor C-5 of FIG. 1, since the return path for carrier frequency base current is directly to the other side of coil L-4, and not through the effective generator impedance even in the absence of a shunt capacitor such as C-5 of FIG. 1. The equivalent circuit of FIG. 2b illustrates that the shunting capacitive elements introduced in the prior device both directly by use of the coupling capacitor C-B and indirectly from Miller effect on the use of C-B are eliminated, and the undesirable subcarrier attenuation caused by the shunt capacitor C-5 has been eliminated, thereby allowing a much more satisfactory frequency response. The higher audio frequencies now will be properly modulated on the response carrier without the attenuation heretofore caused by the effective shunt capacitance.

The invention also may be incorporated in a modified form of responder in which crystal RF filters are utilized with the responder tuned input circuit to code the response by filtering out sidebands prior to demodulation, rather than as shown herein. The invention is applicable to any responder incorporating an oscillator which must be driven by and powered by a composite signal of the type mentioned, to provide a modulated signal having audio components corresponding to audio components superimposed on the oscillator power supply.

What is claimed is:

1. In a passive responder device for receiving an interrogator signal having a plurality of sideband frequencies and for developing therefrom a composite voltage including a direct current component and a plurality of audio frequency currents, frequency sensitive means for selectively eliminating at least one of the audio frequencies and for passing others of the audio frequencies, an oscillator circuit comprising a transistor and an anti-resonant tank circuit, said anti-resonant tank circuit including a multiple winding radio frequency transformer coupled to the transistor for sustaining oscillation at a predetermined response frequency upon application of the direct current component voltage, said transformer being operable to isolate the audio frequency currents from the anti-resonant tank circuit to prevent undue attenuation thereof while permitting modulation of the response frequency oscillation by the audio frequency currents.

2. A passive responder device for receiving an interrogator signal having a plurality of sideband frequencies, said device comprising a detector means for receiving and detecting the interrogator signal to generate a plurality of audio signals corresponding to the sideband frequencies, frequency selective means coupled to the detector means for eliminating selected ones of the audio signals and for passing the other audio signals, and an oscillator means for generating a response signal, said oscillator means including a multiple winding transformer coupled to a transistor having an emitter electrode, a base electrode, and a collector electrode, said transformer providing a radio frequency coupling between different electrodes of the transistor for sustaining radio frequency oscillations of the response signal while providing an isolation for the audio signals, said transistor and said transformer being coupled to the detector means whereby the response signal is modulated by the audio signals which are passed by the frequency selective means.

3. A passive responder device for receiving an interrogator signal having a carrier frequency and a plurality of sideband frequencies, said device comprising a detector means for receiving and detecting the interrogator signal and for generating a direct current voltage from the carrier frequency and a plurality of audio signals corresponding to the sideband frequencies, frequency selective means coupled to the detector means for eliminating selected ones of the audio signals and for passing the other audio signals, and an oscillator means for generating a response signal, said oscillator means including a multiple winding radio frequency transformer coupled to a transistor having an emitter electrode, a base electrode and a collector electrode, said transformer having one winding coupled between the base electrode and the emitter electrode of the transistor and having another winding coupled to the collector electrode thereof for providing a regenerative feedback to sustain oscillation at a predetermined response frequency when energized by the direct current voltage from the detecting means, said base electrode of the transistor being coupled to the frequency selective means whereby the response frequency oscillation is modulated with the audio frequencies passed by the frequency selective means to generate the response signal.

4. A passive responder device for receiving an interrogator signal having a carrier frequency and a plurality of sideband frequencies, said device comprising a detector circuit for receiving and detecting the interrogator signal and for generating a direct current voltage from the carrier frequency and a plurality of audio signals corresponding to the sideband frequencies, at least one tuned circuit for trapping out and eliminating a selected audio signal and for passing the other audio signals, an oscillator circuit including an anti-resonant tank circuit and a transistor having an emitter electrode, a base electrode and a collector electrode, said tank circuit including a two-winding transformer with one of the windings coupled to pass radio frequencies between the base electrode and the emitter electrode of the transistor, said transformer providing a magnetic coupling for a regenerative feedback path between the base electrode and the tank circuit whereby oscillations are sustained at a predetermined response frequency, and a resistive element coupled between the tuned circuit and the base electrode of the transistor for passing the audio frequencies which are modulated upon the response frequency oscillations to generate a coded response signal.

5. In a passive responder device for receiving an interrogator signal and for developing therefrom a composite signal including a direct current voltage and a plurality of audio frequency currents, an oscillator circuit comprising an anti-resonant tank circuit, a transistor having an emitter electrode, a base electrode and a collector electrode, a resistive element coupled to the base electrode of the transistor for passing the audio frequency currents thereto, said anti-resonant tank circuit including a two-winding radio frequency transformer having one winding thereof coupled across a first capacitor, said tank circuit being coupled to the collector electrode of the transistor, a second winding of the transformer being connected in series with a second capacitor and being coupled between the emitter electrode and the base electrode of the transistor, said second capacitor being operable to pass radio frequency currents of the response frequency and being further operable to block the audio frequency currents, said second capacitor and said transformer providing a regenerative feedback path between the base electrode and the collector electrode of the transistor, said regenerative feedback path including a tank circuit whereby oscillations are generated at a predetermined response frequency, said audio frequency currents passed by the resistive element being operable to modulate the response frequency oscillations to develop a coded response signal.

6. A passive responder device for receiving an interrogator signal and providing a coded response signal, said interrogator signal comprising an interrogator carrier and a first set of discrete sideband frequencies, said response signal comprising a response carrier and a different set of sideband frequencies, said responder including means responsive to said interrogator signal for providing an encoded composite signal voltage having a direct component and a plurality of superimposed subcarrier frequency components; and a response oscillator, said oscillator comprising an oscillator anti-resonant tank circuit and the collector-emitter circuit of a transistor connected in series across said encoded composite signal voltage, said anti-resonant tank circuit comprising a first inductance and a capacitance connected in parallel, a second inductance inductively coupled to said first inductance to provide a response carrier feedback signal, circuit means including a carrier frequency coupling capacitance for applying said feedback signal between the base and emitter of said transistor, and a resistor connected to said base of said transistor in parallel with a series path comprising the base-collector junction of said transistor and said anti-resonant tank circuit.

References Cited in the file of this patent

UNITED STATES PATENTS 2,851,592     Webster _____ Sept. 9, 1958